Dec. 4, 1934.       J. G. PAULIN       1,983,486
MEASURING INSTRUMENT
Filed March 24, 1931      2 Sheets-Sheet 1

J. G. Paulin
INVENTOR

By Marks & Clerk
Attys.

Dec. 4, 1934.   J. G. PAULIN   1,983,486
MEASURING INSTRUMENT
Filed March 24, 1931   2 Sheets-Sheet 2

Patented Dec. 4, 1934

1,983,486

UNITED STATES PATENT OFFICE 1,983,486

MEASURING INSTRUMENT

Josua Gabriel Paulin, Eskilstuna, Sweden

Application March 24, 1931, Serial No. 524,947
In Sweden March 29, 1930

7 Claims. (Cl. 73—4)

The present invention relates to such instruments for measuring variable forces in which the measuring member influenced by said forces is also actuated by a counter spring force. More particularly the invention relates to such instruments in which said force may be adjusted by means of a zeroizing device adapted to restore the measuring member to middle or zero position when reading off the instrument, the shifting motion of the zeroizing device being then an indication of the force to be measured. The invention is primarily applicable to aneroid barometers adapted to be read according to the zero method.

In such instruments the zeroizing is preferably brought about by means of a micrometer screw or the like disposed axially in relation to the diaphragm and a nut threaded thereon through the axial displacement of which the tension of the counter spring engaged between the nut and the diaphragm is adjusted. On account of the considerable counter spring tension required it is, however, difficult to dispose a single adjustable counter spring in such an instrument in axial direction in relation to the micrometer screw on account of breaking action in the nut and considerable increase in friction and lost motion caused thereby. As a rule the adjustable spring force must therefore be composed by a system of springs disposed symmetrically in relation to the screw which involves a certain complication. Further the zeroizing device has a rather heavy motion which is particularly disadvantageous in instruments adapted to be zeroized automatically and continually, for instance by means of a clock work. To reduce the friction lubricants must be applied to the micrometer screw and the nut. Particularly in air craft instruments, this results in the inconvenience that the lubricant congeals or freezes at low temperatures, whereby the zeroizing device offers a still greater friction.

According to the invention these inconveniences are eliminated in that the adjustable counter spring is disposed under tension between the measuring member, such as the diaphragm of an aneroid barometer, and a pivoted lever adjustable into different angular positions for the regulation of the counter spring force, the adjusting motion being caused by a turn handle or other operating member.

Figure 1:
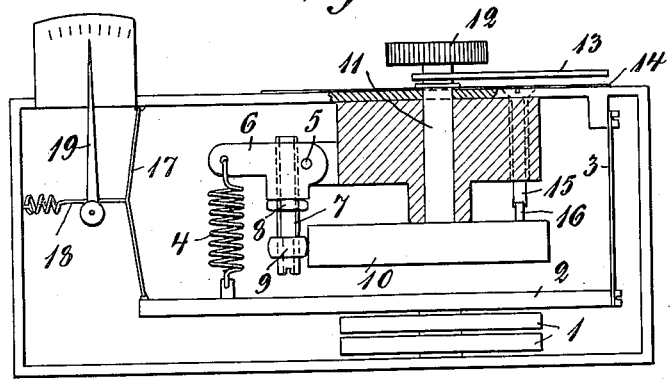
Figure 2:
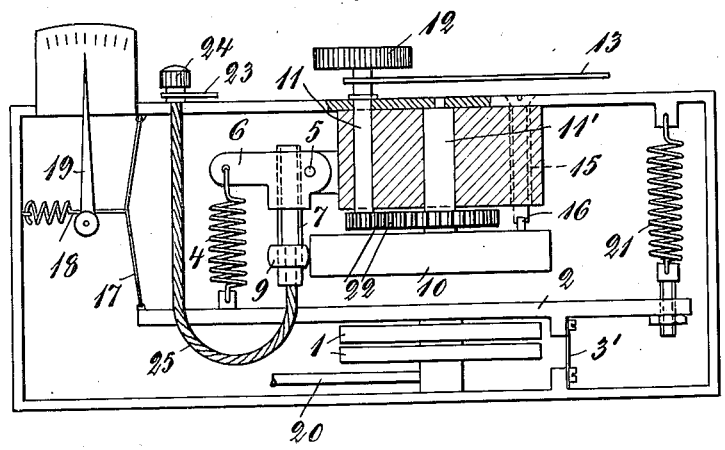
Figure 3:
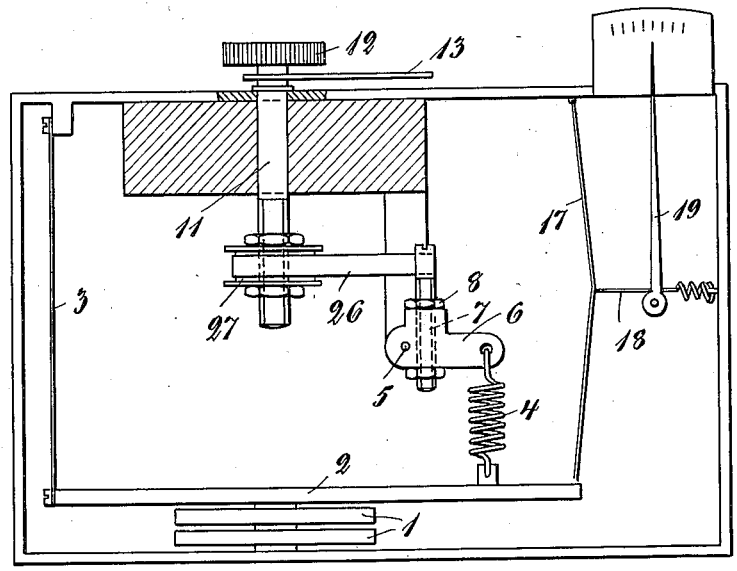
Figure 4:
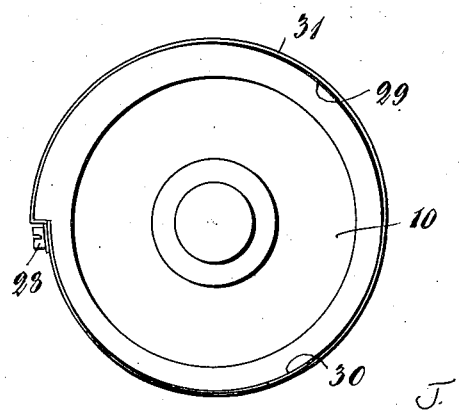

The invention will be more closely described with reference to the accompanying drawings showing three different embodiments of the invention. Figure 1 is a sectional view of an embodiment of an aneroid barometer according to the invention. Figure 2 is a corresponding section of a manometer designed in similar manner. Figure 3 shows a modification of the embodiment acording to Fig. 1. Fig. 4 is a detail.

In the aneroid barometer according to Figure 1 the free diaphragm surface of the diaphragm box system 1 is at its middle connected with a lever or balance 2 suspended in the frame by its one end by means of a leaf spring 3 and by its other end connected with the lower end of a helical spring 4 the opposite end of which is fixed to an arm 6 pivoted in the frame at 5. The arm 6 forms the one lever arm of an angular lever or bell crank the other arm of which is formed by a screw 7 tapped into the arm 6 and provided with a stop nut 8 and carrying a roller or wheel 9 being pressed towards the periphery of a rotatable excentric disc or cam disc 10 by the spring tension. Said cam disc is secured to the lower end of a spindle 11 journalled in the frame and carrying at its upper end a hand wheel or a turn handle 12 and a pointer 13 movable over a fixed scale 14. The rotating motion of the cam disc is limited by a stop screw 15 against which an abutment 16 of the cam disc abuts upon the cam disc reaching its extreme position.

Between the free end of the lever 2 and the frame a flexible band or the like 17 is stretched and between the middle point thereof and a spring fixed in the frame another band 18 is stretched and wound about a shaft of a tendency pointer 19 which is movable over a scale.

When the instrument is zeroized, i. e. when the diaphragm system takes up its middle position, the tendency pointer 19 indicates zero on the appertaining scale. The pointer 13 connected with the operating handle 12 indicates then on the scale 14 the value of the air pressure prevailing for the time being. If the air pressure now rises the balance lever 2 is lowered and the angular band 17 is somewhat rectified the tendency pointer 19 then deflecting to the right. To set the instrument on zero in a new reading the handle is shifted in such a direction that the angular lever 6, 7 is turned in clockwise direction by the cam disc 10 whereby the tension of the counter spring 4 is increased and the tendency pointer 19 returns to its zero position. The amount of rotation of the handle required to restore the tendency pointer to zero constitutes a measure of the change in air pressure after the preceding zeroizing. Upon falling air pressure the zeroizing takes place by rotating the handle 12 in the opposite direction.

The length of the lever arm bearing against the cam disc 10 may be varied by shifting the screw 7 in relation to the arm 6 after unscrewing the stop nut 8. Hereby the measuring range of the instrument may be changed in a manner being mathematically exactly controllable which fact is of great importance from the point of view of manufacture because the instrument may easily be so adjusted thereby that it has a correct indication at the two extreme points of the scale. Also in other respects said disposition is of importance as will be elucidated in the following.

By giving a suitable contour to the cam disc 10 the instrument may be adapted to operate with a uniformly divided pressure scale, if used as barometer, or with a uniformly divided altitude scale in case the instrument is to be used as an altitude meter.

In the manometer according to Figure 2 the diaphragm boxes are disposed in communication with the receptacle or the like in which the pressure is to be measured through a tube 20. Otherwise the device according to Figure 2 is differentiated from that previously described thereby that the motion of the turn handle 12 is transferred to the cam disc 10 journalled on a separate shaft 11′ through intermeshing toothed wheels 22 keyed on the shafts 11 and 11′. Further the lever 2 is suspended at its right hand end by means of a screw spring 21 and, at a point near the said end, is connected with the base of the instrument by means of a flexible metal band 3′.

In the instrument according to Figure 2 the measuring range may easily be changed from the outside by means of a turn handle 24 disposed on the top side of the instrument and having a pointer 23 and being connected with the screw 7 through a flexible shaft or the like 25. The stop nut 8 of said screw is in this case removed. The pointer 23 indicates then on a separate scale the change in the measuring range effected.

If the instrument according to Figure 2 is for example adapted to measure the quantity of liquid in containers of such a shape that their liquid contents is proportional to the liquid level and to the specific gravity of the liquid the instrument may be set by means of the turn handle 24 so as to render possible its application in measuring liquids having different specific gravities.

The adjusting device 24, 25 may be used also in other instruments, by way of example in altitude measuring instruments, for the temperature adjustment thereof. The scale appertaining to the pointer 23 may then be provided with such a temperature graduation that the instrument may be directly set in accordance with the prevailing air temperature. After reading the main pointer of the instrument at two different field points one may immediately obtain the altitude difference between said points without having recourse to the correction calculations in regard to air temperature which hitherto has been necessary.

In the embodiment according to Figure 3 the angular lever is connected with the turn handle 12 through a band or another flexible connection 26 which by its one end is fixed to the lever arm 7 and by its opposite end is partially wound on a wheel or cam disc 27 secured to the shaft 11 of the turn handle. To vary the measuring range of the instrument the screw 7 or the wheel 27 may be vertically shiftable.

According to Figure 4 the cam disc 10 is provided with a circumferential coating consisting of a steel band or the like wound on the periphery of the disc both ends of said band being commonly secured to the disc by means of a screw 28. This coating is useful for example in case the cam disc is made of aluminum or other light metal. Without this protecting coating the circumference of the cam disc would be worn off by the wheel 9 and the instrument rendered faulty. The disposition of a band 31 wound on the cam disc and fixed at one point is of importance in certain cases and particularly in case a correction of the contour of the cam disc is desired. In gauging the instrument, i. e. in comparing the instrument with a standard instrument, one may proceed in the following manner. At those spots of the circumference of the cam disc in which a fault in the indication of the instrument occurs a small piece of metal sheet 29, 30 of suitable thickness and length is inserted under the steel band 31 after untightening the screw 28. Thereupon the screw 28 is again tightened. If the measuring range of the instrument is noticeably changed by the piece inserted under the steel band 31 said range may again be correctly adjusted by displacing the wheel 9 upwards or downwards by means of the appertaining screw. In this manner precision instruments may be manufactured in which practically no corrections at all of the deflections are necessary.

I claim:—

1. A measuring instrument comprising in combination a measuring member operated by gas pressure, a counter-spring, means connecting one end of said spring with said measuring member, an adjusting lever connected with the opposite end of the counter-spring, a rotatable cam disc, and means operatively connecting said adjusting lever with the circumference of said cam disc so as to vary the spring tension upon rotation of the cam disc.

2. An instrument as claimed in claim 1, wherein a protective coating is provided about the circumference of the cam disc and consists of a metal band.

3. A measuring instrument comprising in combination a measuring member operated by gas pressure, a counter-spring, means connecting one end of said spring with said measuring member, an adjusting angle lever, means connecting one arm of said adjusting lever with the opposite end of the counter-spring, a cam disc rotatable about an axis substantially parallel with the other lever arm, and means connecting the last mentioned lever arm operatively with the circumference of said cam disc so as to vary the spring tension upon rotation of the cam disc.

4. An instrument as claimed in claim 3, wherein the lever arm last mentioned is held bearing against the circumference of the cam disc under the influence of the tension of the counter-spring.

5. A measuring instrument comprising in combination a measuring member operated by gas pressure, a counter-spring, means connecting one end of said counter-spring with said measuring member, an adjusting angle lever, means connecting one arm of said adjusting lever with the opposite end of the counter-spring, means for adjusting the length of the other arm of said lever, a cam disc rotatable about an axis substantially parallel with the last mentioned lever arm, and means connecting the last mentioned lever arm operatively with the circumference of said cam disc so as to vary the spring tension upon rotation of the cam disc.

6. An instrument as claimed in claim 5, wherein the lever arm consists of an adjustable screw.

7. A measuring instrument comprising in combination a diaphragm operated by gas pressure, a counter-spring, an elongated balance lever having its longitudinal axis perpendicular to the line of movement of the diaphragm and connecting one end of the counter-spring with the diaphragm, means connecting the balance lever with a tendency pointer, an adjusting lever having one arm substantially parallel with the balance lever, said arm being connected with the opposite end of the counter-spring, a rotatable cam disc, and means operatively connecting said adjusting lever with the circumference of said cam disc so as to vary the spring tension upon rotation of the cam disc.

JOSUA GABRIEL PAULIN.